United States Patent [19]

Kersey et al.

[11] Patent Number: 5,180,190
[45] Date of Patent: Jan. 19, 1993

[54] DAMAGE-RESISTANT CONTAINMENT DEVICE

[75] Inventors: Joe B. Kersey; Gail F. Davis, both of Duncan, Okla.

[73] Assignee: Halliburton Company, Duncan, Okla.

[21] Appl. No.: 750,718

[22] Filed: Aug. 20, 1991

Related U.S. Application Data

[63] Continuation of Ser. No. 531,980, Jun. 1, 1990, abandoned.

[51] Int. Cl.$^5$ .................. B60F 3/22; B65D 90/02
[52] U.S. Cl. .................. 280/838; 220/453;
220/455; 220/458; 220/461; 220/562; 220/565;
220/900; 220/DIG. 24; 280/830; 280/839;
428/36.1; 428/36.4
[58] Field of Search ............... 220/453, 454, 455, 456,
220/457, 461, 462, 468, 470, 562, 565, 590, 900,
DIG. 14, DIG. 24; 428/36.1, 36.4; 280/838,
839, 830, 832

[56] References Cited

U.S. PATENT DOCUMENTS

| | | | |
|---|---|---|---|
| 2,071,330 | 2/1937 | Buckholz | 280/838 |
| 3,158,383 | 11/1964 | Anderson et al. | 220/562 |
| 3,163,435 | 12/1964 | Krueger et al. | 220/562 |
| 3,604,719 | 9/1971 | Kerr | 280/839 |
| 3,840,139 | 10/1974 | Harmon | 220/590 |
| 3,843,010 | 10/1974 | Morse et al. | 220/590 |
| 4,452,375 | 6/1984 | Marcus | 220/456 |
| 4,526,823 | 7/1985 | Farnell et al. | 220/453 |
| 4,613,535 | 9/1986 | Harpell et al. | 428/911 |
| 4,625,892 | 12/1986 | Carlin, Jr. | 220/465 |
| 4,817,817 | 4/1989 | Palazzo | 220/453 |
| 5,000,342 | 3/1991 | Sharp | 220/455 |

FOREIGN PATENT DOCUMENTS 10258  3/1981  Japan .................. 428/36.4

OTHER PUBLICATIONS

"The Innovators in Polyolefin Tanks & Accessories" Brochure by Poly Processing, Inc.

Primary Examiner—Mitchell J. Hill
Attorney, Agent, or Firm—James R. Duzan; Dennis D. Brown

[57] ABSTRACT

A damage-resistant containment device includes a high strength fiber covering the surface of the container and an elastomeric matrix supporting the fiber and bonding the fiber to the surface of the container. The device and method provide a damage-resistant polyolefin container which may be used to transport hazardous fluids by vehicles, such as trucks, on publicly used thoroughfares.

18 Claims, 1 Drawing Sheet

DAMAGE-RESISTANT CONTAINMENT DEVICE

This is a continuation of copending application Ser. No. 07/531,980, filed on Jun. 1, 1990, now abandoned.

BACKGROUND OF THE INVENTION

This invention relates to damage-resistant containment devices and more particularly, but not by way of limitation, to transportable damage-resistant containment devices, such as transportable cargo tanks, and methods of transporting bulk materials and fluids in damage-resistant containment devices.

Traditionally, bulk materials and fluids, such as water, oil, gasoline, other hydrocarbons, acids, etc., have been stored and transported in metal containers or tanks. Metal tanks have been used because of their strength, the availability of metal materials, the ability of metals to form into reliable containers, and their relatively low cost factor compared to other traditional materials having comparable qualities.

There are non-metallic materials which are as readily available, which are less expensive, which are more easily and inexpensively formed into tanks, and which are lighter in weight than metal. Such materials include polymers, such as polyolefins.

However, there are problems in using the non-metallic materials. Commonly, the non-metallic materials are more easily fractured, punctured, or otherwise ruptured, even though they will structurally contain and support the bulk material, fluids, or other contents.

In the past, some of the non-metal materials have been used in combination with strengthening materials, such as inside a metal shell. U.S. Pat. No. 4,625,892, issued to Carlin, Jr., discloses one such composite tank.

There are shortcomings in the use of strengthening materials or metals in combination with the non-metal tanks. For example, the use of two materials drives up the overall cost of the material content of the container as well as the cost of making the container, i.e., the composite structure requires additional assembly and manufacturing time.

Lining Technologies, Inc. of Port Allen, La., has been bullet-proofing United States Coast Guard boats with unmatrixed high-strength polyethylene fibers and protecting foam buoys with a coating of high strength polyethylene fibers in a polyurethane matrix. Lining Technologies has been using Spectra 900 fibers, which are made by the High Performance Fiber Group of Allied-Signal, Inc. and a methyl-di-iso-cynate aliphatic polyurethane, which is sold under the tradename Seathane TM by Lining Technologies, to make the protective coating for foam buoys.

However, neither the bullet-proofing used by Lining Technologies to protect boats nor the coating used to protect foam buoys has been applied to containers for bulk materials and fluids, and, more particularly, has not been applied to transportable cargo containers for hazardous fluids.

Therefore, there is a need for a damage-resistant containment device which does not require the use of metals and for an improved method of transporting cargo in a damage-resistant containment device.

SUMMARY OF THE INVENTION

It is contemplated that the present invention overcomes the foregoing shortcomings and meets the above-described needs. In accomplishing this, the present invention provides a novel and improved damage-resistant containment device and method for transporting cargo in a damage-resistant containment device.

The damage-resistant containment device includes a container and a damage-resistant coating. The damage-resistant coating includes at least one high strength fiber and an elastomeric matrix for supporting the fiber and for bonding the fiber to the container. The matrix is preferably a flexible polymer, such as a flexible polyurethane. The fiber is preferably polyethylene, such as a polyethylene cloth. The container is preferably a non-metallic container and is more preferably made of a polyolefin, such as polyethylene. The damage-resistant container also includes transportation means, supportingly connected to the container, for transporting the container.

The method of transporting cargo in a damage-resistant containment device includes coating a container with a first coating of elastomeric matrix and embedding a first layer of high strength fiber in the matrix. The method provides for supportingly connecting the container to a vehicle for transporting the container and its cargo. The method also provides for coating the embedded first layer of fiber with a second coating of elastomeric matrix and embedding a second layer of high strength fiber in the second coating of matrix.

It is an advantage of the present invention to provide a non-metallic damage-resistant containment device which may be used as a cargo tank on vehicles.

It is an advantage of the device and method of the present invention to provide a polyolefin container which may be used to safely transport hazardous fluids on publicly used thoroughfares.

It is an advantage of the present invention to substantially increase the insulation factor of a polyethylene container.

It is an advantage of the present invention to provide permanent ultraviolet protection for a polyethylene container.

BRIEF DESCRIPTION OF THE DRAWINGS

The present invention will be better understood by reference to the examples of the following drawings.

DETAILED DESCRIPTION OF THE PREFERRED EMBODIMENTS

FIGS. 1–4 present preferred embodiments of a damage-resistant containment device, generally designated 20; as well as a method for transporting cargo in a damage-resistant container, of the present invention. Referring to the example of FIG. 3, the damage-resistant containment device 20 may be generally described as including a container 22 and a damage-resistant coating 24.

Figure 1:
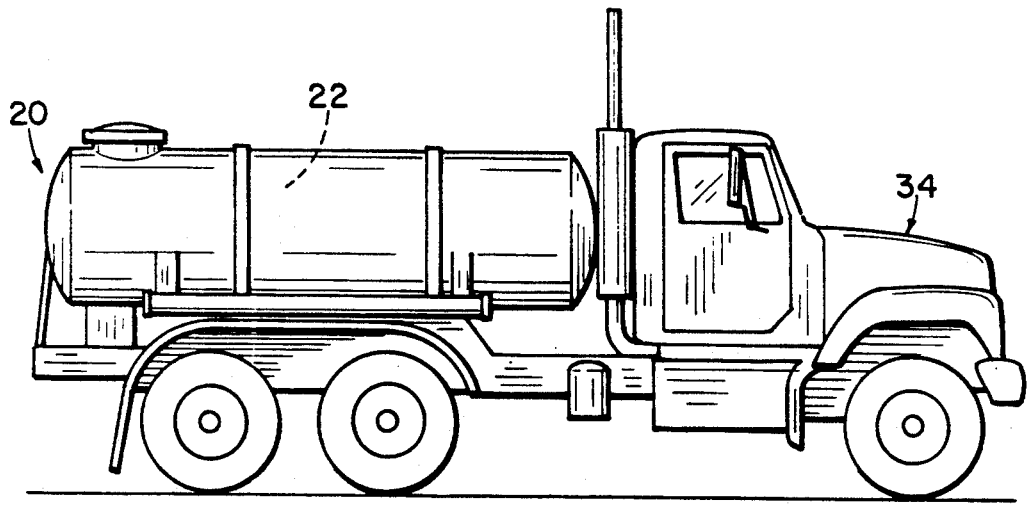
FIG. 1 is a side view of an embodiment of the damage-resistant containment device of the present invention.
Figure 2:
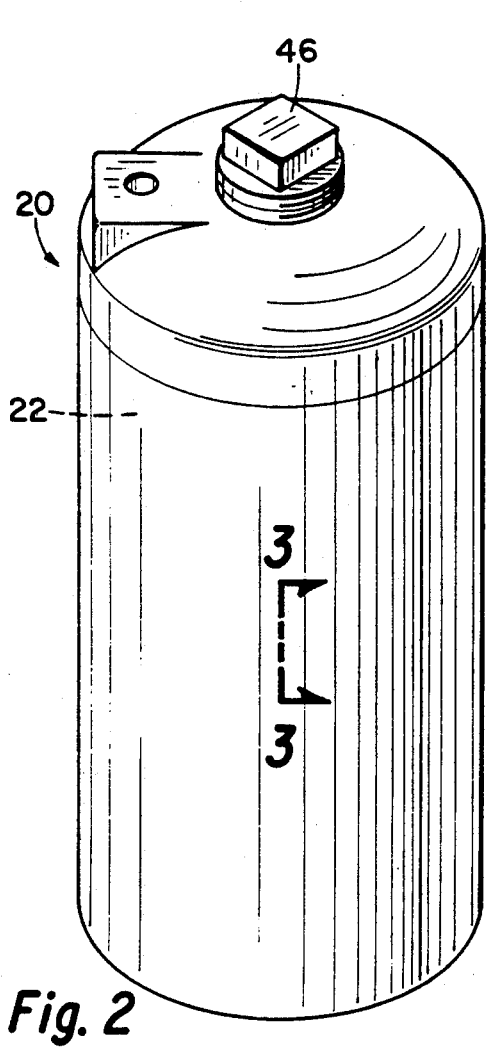
FIG. 2 is a side view of another embodiment of the damage-resistant containment device of the present invention.
Figure 3:
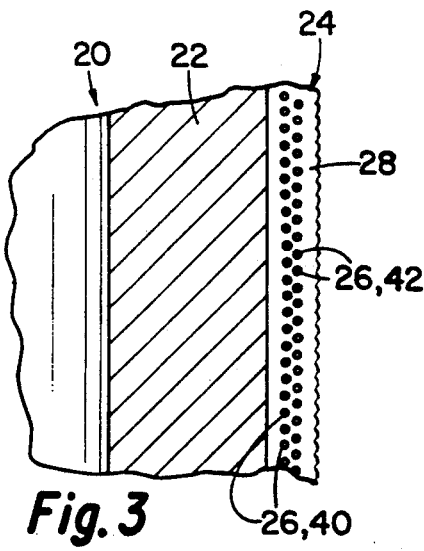
FIG. 3 is a view taken along line 3—3 on FIG. 2.
Figure 4:
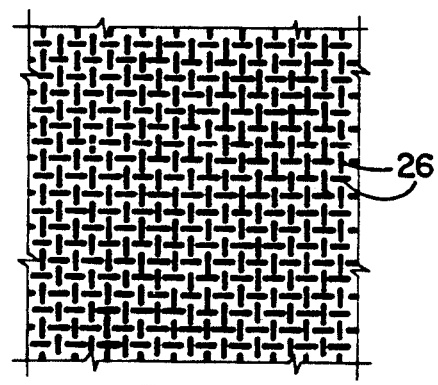
FIG. 4 is a plan view of an embodiment of the fiber of the present invention.

Referring to the example of FIG. 3, the damage-resistant coating 24 may be generally described as comprising at least one, and preferably a plurality, of high strength fibers 26 and an elastomeric matrix 28 for supporting the fibers 26 and for bonding or fastening the fibers 26 to the container 22.

The matrix 28 may be any elastomeric composition which will support and fasten the fiber 26 to the container 22. The matrix 28 may take various chemical compositions, depending on the composition of the fiber 26 and the composition of the container.

Preferably, the matrix 28 is a flexible polymer. More preferably, the matrix is a flexible polyurethane. In the prototype coating 24 the matrix is a methyl-di-isocynate aliphatic polyurethane ("MDI aliphatic polyurethane"). The MDI aliphatic polyurethane used in the prototype is known by the tradename Seathane TM and is developed and marketed by Lining Technologies, Inc. of Port Allen, La.

The fiber 26 should extend over the entire surface of the container 22 which is to be protected. This may be either the inside or outside surface or both surfaces of the container 22. Preferably, the fiber 26 and matrix 28 are placed on the surface of the container 22 which is most likely to be exposed to sources of damage, such as blows or impacts from other objects, ultraviolet light, etc. In the prototype device 20, the fiber 26 and coating 24 are placed on the outside surface of the container 22.

It is contemplated that the high strength fiber 26 may be nylon, glass, carbon, graphite, and other known high strength fibers which are chemically compatible with the matrix 28 and the container 22. Preferably, the fiber 26 is a high strength polyethylene fiber. More preferably, the fiber 26 is a super ultra high molecular weight polyethylene fiber, such as Spectra 900 TM fiber which is made by the High Performance Fiber Group of Allied-Signal, Inc.; or Kevlar TM aramid fiber which is made by the Dupont Company. In the prototype device 20, the fiber 26 used is a woven, five ounces per yard, cloth of Spectra 900 TM fiber.

In the prototype device 20, as illustrated in FIG. 3, two layers of fiber cloth 26 are embedded in the elastomeric matrix 28, as further discussed below. In the prototype device 20, one thickness of cloth fiber 26 was used in each layer of fiber 26. The cloth fiber 26 may be laid or wrapped in the matrix 28 by hand or machine. If a single fiber 26 or parallel fibers 26 are to be used, they may be wrapped or wound about the container using known techniques, such as filament winding.

The container 22 may be virtually any type of container to which the coating 24 may be applied, e.g., any type of tank, bottle, or other vessel which may be used to contain a fluid or bulk material. Preferably, as exemplified in FIG. 2, the container 22 is a closed container, such as a tank or vessel which may be used to contain hazardous or toxic fluids. The preferred container 22 is made of a material which will support and contain the desired contents or cargo without the coating 24. The coating 24 is added to protect the container 22, i.e., to improve the container's resistance to damage from physical blows or impacts as well as from other damaging agents as ultraviolet light.

The container 22 may be made of virtually any material and will normally be made of a non-metallic material. Preferably, the container 22 is made of polyolefin. More preferably, the container 22 is made of polyethylene. Most preferably, the container 22 is a high density, crosslinked, rotationally-molded, polyethylene container 22.

It is contemplated that the damage-resistant containment device 20 will have many uses and will take many shapes in serving as a container for bulk materials, fluids, and other cargo. For example, the damage-resistant containment device 20 may be a storage tank or bottle 22, as exemplified in FIG. 2. Preferably, as exemplified in FIG. 1, the device 20 will include transportation means 34, supportingly connected to the container 22, for transporting the container 22 and its cargo. The transportation means 34 may be a ship, airplane, or other vehicle, and is preferably designed for carrying a closed container 22, such as the tank 22 illustrated in FIG. 1. More preferably, the transportation means 34 comprises a wheeled vehicle, also designated 34, such as the truck exemplified in FIG. 1. In FIG. 3, the damage-resistant containment device 20 is illustrated as an acid transport truck, i.e., acid is transported in the container 22. Typically, such an acid truck is used in the oil and gas industry for servicing wells. It is intended to be understood that a preferred use of the damage-resistant container 22 is in transporting hazardous and toxic fluids, such as gasoline, other hydrocarbons, and other dangerous fluids on wheeled vehicles, such as trucks and railroad cars.

The damage-resistant containment device 20 may be mounted on a skid (not illustrated) which may in turn be mounted on a vehicle. The damage-resistant containment 20 may also be directly mounted on a vehicle 34, as exemplified in FIG. 1. The coating 24 may be applied to the container 22 before or after the device 20 is mounted on a skid, vehicle 34, or other support structure. Preferably, the coating 24 will be applied to the container 22 before the container 22 is connected to any other structure or vehicle 34.

In making the container 22 damage-resistant, first the outside surface of the container 22 should be prepared to receive the matrix 28, i.e., the surface of the container 22 should be prepared as best possible to facilitate bonding of the matrix 28 to the container 22. In the prototype, the surface of the container 22 was cleaned and etched with methyl ethyl ketone ("MEK"). It is contemplated that the MEK may slightly soften the surface of polyethylene and thereby enhance the bonding between the polyethylene container surface and the polyurethane matrix.

After preparation, the surface of the container 22 was spray-coated with a matrix 28 of the Seathane TM MDI aliphatic polyurethane described above. While the matrix 28 of polyurethane was still wet, a layer of Spectra 900 TM polyethylene fiber cloth, as described above, was applied to the surface of the container. The fiber cloth 26 was immediately rolled into the matrix 28 with a roller to work out any bubbles. After application of the first layer 40 of fibers, another coat of matrix 28 was sprayed on top of the first layer 40 to ensure that the first layer 40 of fibers was completely wetted or embedded in matrix 28. After application of the second coat of matrix, a second layer 42 of the fiber cloth 26 was applied in the same manner as the first layer 40 of fibers 26. After application of the second layer 42 of fibers 26 to the container 22, the second layer 42 was finish coated or sprayed with a third coating of the polyurethane matrix 28, to ensure that the second layer 42 of the fibers 26 was completely wetted and embedded in the matrix 28.

The polyurethane matrix 28 was catalyzed before spraying onto the container 22. In the prototype device 20, the two layers 40, 42 of fibers 26 and the matrix 28 combine to form a total coating 24 which had a thickness of approximately ⅛ inch. At the present time it is not felt that the thickness of the coating 28 is important as long as the fibers 26 are fully wetted and embedded in the matrix 28.

At the corners, ends, and neck of the container 22 the fiber cloth 26 was overlapped approximately one inch, i.e., at any point where the edges of two pieces of fiber cloth 26 met a one inch overlap was created to strengthen such joinings. For example, the separate piece of cloth 26 which covered the bottom of the container 22 was folded around the side of the container 22 sufficiently to overlap with the pieces of cloth 26 which covered the sides of the container approximately one inch. The opening for the threaded plug or cap 46 in the prototype container 22 was cut after the coating 24 was applied.

The practice of the invention will be better understood by a consideration of the following examples, which are provided by way of illustration and explanation and which are not intended to be limiting.

EXAMPLE I—IMPACT TESTING

INTRODUCTION—This testing was initiated to examine the possibility of using non-metallic composite containers as cargo tanks to transport agressive and hazardous chemicals. The containers would have to possess the ability to withstand impact loads without loss of integrity as well as meet other as yet unknown U.S. Department of Transportation ("DOT") requirements. Three 3-gallon polyethylene bottles were roto-molded by Poly Processing, Inc., Monroe, La., to meet Halliburton's specifications. The containers were roto-molded to a ¼ inch nominal wall thickness with provisions for a two inch nominal pipe plug threaded insert in an opening at the top of the bottle.

The containers were then sent to Lining Technologies, Port Allen, La., who applied a composite coating on the containers which consisted of Spectra 900 TM fibers in a polyurethane matrix. Spectra 900 TM fibers are made by the High Performance Fiber Group of Allied-Signal, Inc. Spectra 900 TM fibers are claimed to have "unequaled" strength to weight ratio and toughness. The fibers are made of super ultra high molecular weight polyethylene which is inherently resistant to chemical attack and has low water absorption. The general procedure used to apply the composite coating is given above in the Detailed Description of the Preferred Embodiments.

OBJECTIVE—Determine effect of impact loading on the non-metallic composite containers.

CONCLUSION—The composite containers tested demonstrated outstanding resistance to impact load. Repeated drop tests performed on two containers cooled to 0° F. and −40° F. resulted in no leakage or loss of container integrity.

EXPERIMENTAL PROCEDURE—Since there is no applicable DOT Specification for composite containers, it was decided to test two of the three containers according to the requirements of DOT Specification 34 (49 CFR, Subpart A, Section 178.19). This specification covers the requirements for reusable polyethylene drums for use without overpack. Specification 34 requires that randomly selected containers shall be capable of withstanding a four-foot drop at a temperature of 0° F. after being filled to 98% capacity, without leakage.

In addition, more severe tests than required by DOT Specification 34 were performed. The containers were tested by dropping the filled containers onto a steel plate which was laying on a tiled concrete floor, from heights up to seven feet. Both containers were dropped (free-fall) diagonally as well as horizontally such that the outside diameter of the container impacted the corner of a 2×3 steel angle which was placed on the steel plate.

All tests were conducted on both containers after filling to 98% capacity with commercially objected antifreeze (ethylene glycol). The containers tested at 0° F. weighed about 41 pounds after being filled with 1900 ml of antifreeze and balance water. The containers tested at −40° F. weighed about 43 pounds after being filled with concentrated antifreeze. The opening of the containers were fitted with threaded plastic plugs. The threads were teflon taped prior to threading into the container. The containers were cooled to the specified temperature in a cold chamber.

Test details and testing sequence are given below:

| Test No. | Test Description | Test Results |
| --- | --- | --- |
| 1 | Cooled to 0° F. Dropped from height of 48 inches (4 ft) at 30 deg angle onto corner of container. | No leakage or failure. |
| 2 | Cooled to 0° F. Dropped from height of 80 inches (6.67 ft) at 30 deg angle onto corner of container. | No leakage or failure. |
| 3 | Cooled to 0° F. Dropped from height of 48 inches (4 ft) horizontally onto corner of 2 × 3 steel angle. | No leakage or failure. (See FIG. 4) |
| 4 | Cooled to 0° F. Dropped from height of 84 inches (7 ft) horizontally onto corner of 2 × 3 steel angle. | No leakage or failure. |
| 5 | Cooled to −40° F. Dropped from height of 80 inches (6.67 ft) at 30 deg angle onto corner of container. | No leakage or failure. |
| 6 | Cooled to −40° F. Dropped from height of 84 inches (7 ft) horizontally onto corner of 2 × 3 steel angle (See FIG. 5). | No leakage or failure. |

As indicated, neither of the test containers showed any fluid leakage or failure after performing the tests described above. The polyurethane coating was "cut" when dropped on the 2×3 steel angle but the top layer of fibers showed no visible damage. Visual examination of the containers on the inside showed no noticeable damage had occurred to the polyethylene.

SUMMARY—The non-metallic composite containers showed no evidence of failure after being drop tested as described herein. The most severe test was conducted at −40° F. with about 300 feet-pounds of impact energy being applied to a line-type contact area. No evidence of damage to the top layer of fibers could be seen and the interior of the polyethylene container showed no cracking or other signs of damage.

EXAMPLE II—PERMEATION RATE TESTING OF POLYETHYLENE BOTTLES WRAPPED WITH SPECTRA 900 TM FIBERS

INTRODUCTION—This testing was initiated to determine the rate of permeation of Xylene PAD acid through two each polyethylene bottles that were wrapped with Spectra 900 TM fibers in a polyurethane matrix.

The rate of permeation testing was conducted per "Procedure for Testing Chemical Compatability and Rate of Permeation in Polyethylene Packaging and Receptacles" in DOT's Federal Register, Vol. 49, Part 173, Appendix B. The tests were conducted at room temperature for over 180 days as per Test Method 1.

OBJECTIVE—Determine permeation rate and chemical compatibility of Xylene PAD acid contained in two polyethylene test bottles.

CONCLUSION—The calculated rate of permeation was 0.40% and 0.28% for bottles No. 1 and No. 2 respectively after 180 days at room temperature. This meets DOT requirements of 2.0% maximum (0.5% maximum for poisonous materials). Also, no chemical compatability problems were detected and bottles passed the four-foot drop test (filled with water) without cracking or leaking.

DISCUSSION—Both bottles were filled with Xylene PAD acid having the following composition.

50 vol. pct of Xylene+

50 vol. pct of 28% HCl+0.2% HAI-60

+0.2% Losurf 259+1% WS-44.

The bottles were stored in the Metallurgy Lab at Halliburton's Manufacturing Center and periodically tested for weight and size. The raw data determined is given in Tables 1 and 2.

The test was conducted for a total of 240 consecutive days. Weight measurements after 240 days showed the following fluid losses.

Bottle No. 1—0.14 pounds or 63.5 grams
Bottle No. 2—0.10 pounds or 45.4 grams

The calculated permeation rate was $\frac{63.5}{(40.62 - 14.4)(453.6)} \times 100 = \frac{0.53\% \text{ and } 45.4}{(40.78 - 14.4)(453.6)} \times 100 = 0.38\%$, for bottles no. 1 and 2

Interpolated values for 180 days would be 0.40% and 0.28%.

After 240 days, the bottles were emptied. No visible cracks or material degradation was noted.

After this visual examination, the bottles were filled with water at ambient temperature and dropped from a height of four feet onto solid concrete. No cracking, leakage, or other material degradation was noted after the drop tests were conducted.

SUMMARY—After conducting tests described herein, the bottles showed no visible evidence of material cracking, degradation, or leakage. In addition, the rate of permeation of Xylene PAD acid met DOT requirements.

TABLE I

EXAMPLE II
Weight (Pounds) Data

| Time | Bottle No. 1 | Bottle No. 2 |
|---|---|---|
| Initial Bottle Weight | 14.4 | 14.4 |
| Initial Filled Weight | 40.62 | 40.78 |
| After 30 days | 40.60 | 40.80 |
| After 60 days | 40.60 | 40.78 |
| After 90 days | 40.60 | 40.78 |
| After 120 days | 40.60 | 40.78 |
| After 240 days | 40.48 | 40.68 |

TABLE II

EXAMPLE II
Diametral (inches) Data[1]

| Time | Bottle No. 1 | Bottle No. 2 |
|---|---|---|
| Initial | 30¼ | 30 7/16 |
| After 30 days | 30¼ | 30 7/16 |
| After 60 days | 30¼ | 30⅜ |
| After 90 days | 30¼ | 30¼ |
| After 120 days | 30⅜ | 30 7/16 |
| After 240 days | 30⅜ | 30⅜ |

[1]In center section of bottles.

While presently preferred embodiments of the invention have been described herein for the purpose of disclosure, numerous changes in the construction and arrangement of parts and the performance of steps will suggest themselves to those skilled in the art, which changes are encompassed within the spirit of this invention as defined by the following claims.

What is claimed is:

1. A damage-resistant containment device for containing and transporting a cargo, comprising:
   a non-metallic container capable of independently containing and supporting the cargo, the container having an impact receiving surface; and
   a damage-resistant coating, the coating comprising:
   at least one high strength fiber selected from the group consisting of ultrahigh molecular weight polyethylene fiber and high strength aramid fiber; and
   an elastomeric matrix for supporting the fiber and for bonding the fiber to the container,
   wherein the elastomeric matrix bonds the coating to the container and
   wherein the coating is bonded to the impact receiving surface of the container such that the coating protects the container against physical blows and impacts.

2. A device of claim 1 in which the fiber comprises:
   a plurality of ultrahigh molecular weight polyethylene fibers.

3. A device of claim 1, comprising:
   two layers of fiber embedded in the elastomeric matrix.

4. A device of claim 1 in which the matrix comprises:
   a flexible polymer.

5. A device of claim 4 wherein said flexible polymer comprises a flexible polyurethane.

6. A device of claim 5 wherein said flexible polyurethane is a methyl-di-isocyanate aliphatic polyurethane.

7. A device of claim 1 in which the container comprises:
   a polyolefin container.

8. A device of claim 7 wherein said polyolefin container is a high density, crosslinked, polyethylene container.

9. A device of claim 1, comprising:
transportation means, supportingly connected to the container, for transporting the container.

10. A device of claim 9 in which the transportation means comprises:
a wheeled vehicle.

11. A damage-resistant containment device for containing and transporting a cargo, comprising:
a polyolefin container capable of independently containing and supporting the cargo, the container having an impact receiving surface;
a damage-resistant coating, the coating comprising:
a plurality of high strength fibers covering the impact receiving surface of the container, said fibers being selected from the group consisting of ultrahigh molecular weight polyethylene fibers and high strength aramid fibers; and
an elastomeric matrix supporting the fibers and bonding the fibers to the impact receiving surface of the container; and
a wheeled transportation means, supportingly connected to the container, for transporting the container,
wherein the coating is bonded to the impact receiving surface of the container such that the coating protects the container against physical blows and impacts.

12. A device of claim 11 in which the container comprises:
a high density, crosslinked, polyethylene container.

13. A device of claim 11 wherein said elastomeric matrix comprises a flexible polyurethane.

14. A device of claim 13 wherein said flexible polyurethane is a methyl-di-isocyanate aliphatic polyurethane.

15. A damage-resistant containment device for containing and transporting a cargo, comprising:
a high density, crosslinked, polyethylene container capable of independently containing and supporting the cargo, the container having an impact receiving surface and
a damage-resistant coating, the coating comprising:
a first ultrahigh molecular weight polyethylene fiber cloth covering the impact receiving surface of the container and
a flexible polyurethane matrix supporting the fiber cloth and bonding the fiber cloth to the impact receiving surface of the container,
wherein the coating is bonded to the impact receiving surface of the container such that the coating protects the container against physical blows and impacts.

16. A device of claim 15 wherein the flexible polyurethane matrix is a methyl-di-isocyanate aliphatic polyurethane matrix.

17. A device of claim 15 further comprising a wheeled transportation means, supportingly connected to the container, for transporting the container.

18. A device of claim 15 wherein the coating further comprises a second ultrahigh molecular weight polyethylene fiber cloth covering the first ultrahigh molecular weight polyethylene fiber cloth.

* * * * *